US 6,702,403 B2

(12) United States Patent
Haller

(10) Patent No.: US 6,702,403 B2
(45) Date of Patent: Mar. 9, 2004

(54) INTEGRATED COIL ASSEMBLY WITH BUILT-IN CONNECTOR AND METHOD THEREOF

(75) Inventor: Mark D. Haller, Canton, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/880,510

(22) Filed: Jun. 13, 2001

(65) Prior Publication Data

US 2002/0190573 A1 Dec. 19, 2002

(51) Int. Cl.⁷ .................................................. B60T 8/34
(52) U.S. Cl. ................................ 303/116.4; 303/119.3; 303/DIG. 10
(58) Field of Search .......................... 303/116.4, 119.2, 303/119.3, DIG. 10

(56) References Cited

U.S. PATENT DOCUMENTS

| 5,137,455 A | 8/1992 | Moerbe et al. |
| 5,449,226 A | 9/1995 | Fujita et al. |
| 5,466,055 A | 11/1995 | Schmitt et al. |
| 5,685,617 A | 11/1997 | Hio et al. |
| 5,695,259 A | 12/1997 | Isshiki et al. |
| 5,921,639 A | 7/1999 | Hosoya |
| 5,957,547 A | 9/1999 | Schliebe et al. |
| 5,988,772 A | 11/1999 | Hashida |
| 6,042,200 A | 3/2000 | Hosoya et al. |
| 6,059,381 A | 5/2000 | Bayer ........................ 303/116.4 |
| 6,086,043 A | 7/2000 | Hoffelder |

*Primary Examiner*—Matthew C. Graham
(74) *Attorney, Agent, or Firm*—Tarolli, Sundheim, Covell & Tummino L.L.P.

(57) ABSTRACT

An assembly (20) is used with an anti-lock braking system (10) and an associated method. The assembly (20) includes a circuit board (30), a motor (40), a hydromechanical block (50), a lead frame (60), and a plurality of solenoid coils (70). The circuit board (30) integrates the electronics of the anti-lock braking system (10). The motor (40) provides pressurized fluid to the anti-lock braking system (10). The motor (40) is connected to the circuit board (30). The hydromechanical block (50) has a through bore (52). The lead frame (60) has a built-in connector (61) extending through the through bore (52) to the circuit board (30). The plurality of solenoid coils (70) controls flow of the pressurized fluid through the hydromechanical block (50). Each of the plurality of solenoid coils (70) is connected to the lead frame (60) such that the plurality of solenoid coils (70) is electrically connected to the circuit board (30) by the built-in connector (61) of the lead frame (60).

1 Claim, 1 Drawing Sheet

US 6,702,403 B2

INTEGRATED COIL ASSEMBLY WITH BUILT-IN CONNECTOR AND METHOD THEREOF

FIELD OF THE INVENTION

The present invention relates to an automotive anti-lock braking system and, more particularly, to a an integrated coil assembly for use with the automotive anti-lock braking system.

BACKGROUND OF THE INVENTION

A conventional anti-lock braking system integrates an electronic control assembly with the braking system's motor connector and main hydraulic control connector. The conventional main hydraulic control connector includes a solenoid coil assembly press-fit onto valve stems of a hydromechanical block. This assembly is, in turn, interconnected to a main circuit board via a lead frame. The motor connector is also connected to the main circuit board.

The main connector may be interconnected to the main circuit board through a bore in the hydromechanical block in order that the circuit board not be heated by the solenoid coil assembly of the main connector. An electronic control assembly that facilitates assembly while meeting all of the requirements of a conventional anti-lock braking system would beneficially reduce assembly time and efficiency for the anti-lock braking system.

SUMMARY OF THE INVENTION

In accordance with one feature of the present invention, an assembly is used with an anti-lock braking system. The assembly includes a circuit board, a motor, a hydromechanical block, a lead frame, and a plurality of solenoid coils. The circuit board integrates the electronics of the anti-lock braking system. The motor provides pressurized fluid to the anti-lock braking system. The motor is connected to the circuit board. The hydromechanical block has a through bore. The lead frame has a built-in connector extending through the through bore to the circuit board. The plurality of solenoid coils controls flow of the pressurized fluid through the hydromechanical block. Each of the plurality of solenoid coils is connected to the lead frame such that the plurality of solenoid coils is electrically connected to the circuit board by the built-in connector of the lead frame.

In accordance with another feature of the present invention, an assembly is used with an anti-lock braking system. The assembly includes a circuit board, a motor, a hydromechanical block, a lead frame, and a plurality of solenoid coils. The circuit board integrates the electronics of the anti-lock braking system. The motor provides pressurized fluid to the anti-lock braking system. The motor is connected to the circuit board. The hydromechanical block has a through bore. The lead frame has a built-in, integral connector extending through the through bore to the circuit board. The plurality of solenoid coils controls flow of the pressurized fluid through the hydromechanical block. Each of the plurality of solenoid coils is electrically connected to the circuit board by the built-in connector of the lead frame. The plurality of solenoid coils is mechanically connected to a corresponding plurality of valves in the hydromechanical block.

In accordance with still another feature of the present invention, an assembly is used with an anti-lock braking system. The assembly includes circuit board means, motor means, hydromechanical means, lead frame means, and a plurality of coil means. The motor means provides pressurized fluid to the anti-lock braking system. The motor means is connected to the circuit board. The hydromechanical means has a through bore. The lead frame means has a built-in connector means extending through the through bore to the circuit board means. The plurality of coil means controls flow of the pressurized fluid through the hydromechanical means. Each of the plurality of coil means is connected to the lead frame means such that the plurality of coil means is electrically connected to the circuit board means by the built-in connector means of the lead frame means.

In accordance with yet another feature of the present invention, a method is used to assemble an anti-lock braking system. The method includes the following steps: securing a plurality of solenoid coils to a lead frame such that the plurality of solenoid coils are electrically connected to the lead frame; mechanically securing the plurality of solenoid coils to a corresponding plurality of valves in a hydromechanical block; inserting a connector built-in to the lead frame through a bore in the hydromechanical block such that the plurality of solenoid coils is electrically connected to a circuit board; and connecting a motor for the anti-lock braking system to the circuit board.

In accordance with still yet another feature of the present invention, a method is used to electrically control an anti-lock braking system. The method includes the following steps: utilizing a plurality of solenoid coils for actuating a corresponding plurality of hydraulic valves located in a hydromechanical block; transferring control information from a circuit board through a through bore in the hydromechanical block to a lead frame and the plurality of solenoid coils; and communicating control information from the circuit board to a motor for driving a pump such that pressurized hydraulic fluid is provided to the hydromechanical block. The transferring step includes a step of transferring control information between the circuit board and the lead frame through a connector built-in to the lead frame.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF AN EXAMPLE EMBODIMENT

Figure 1:
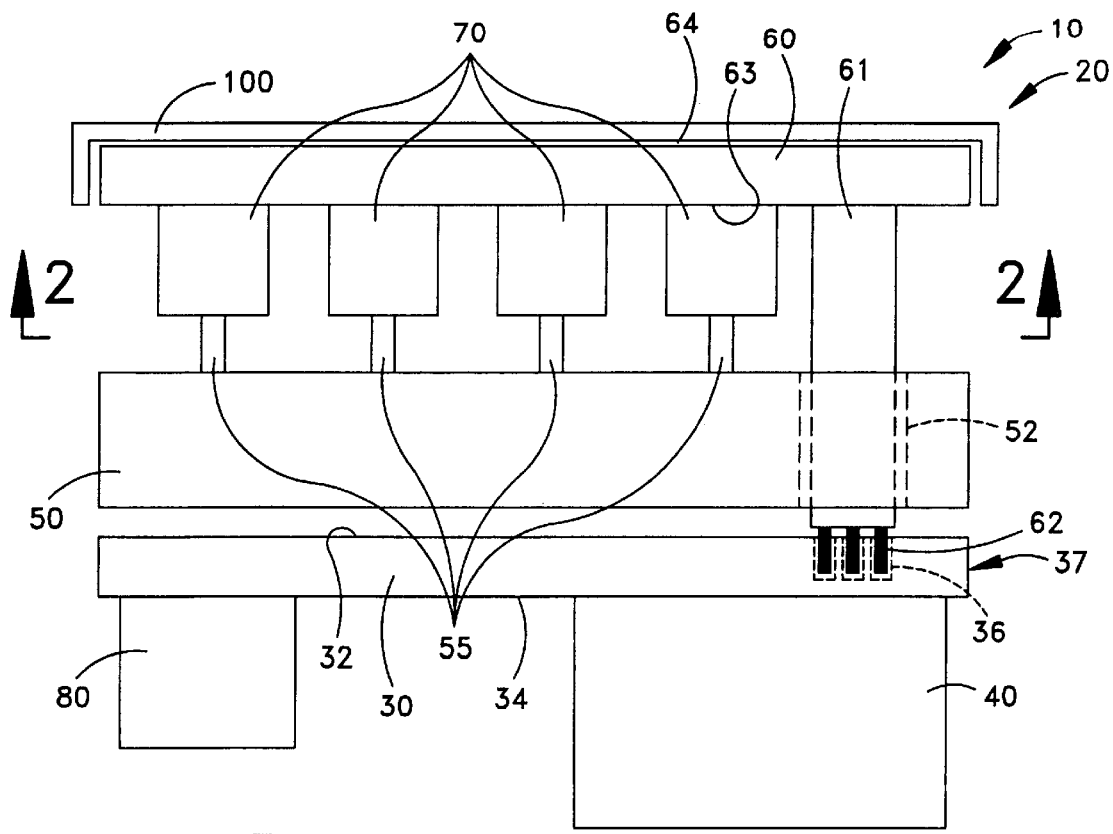
FIG. 1 is a schematic view of an assembly in accordance with the present invention.
Figure 2:
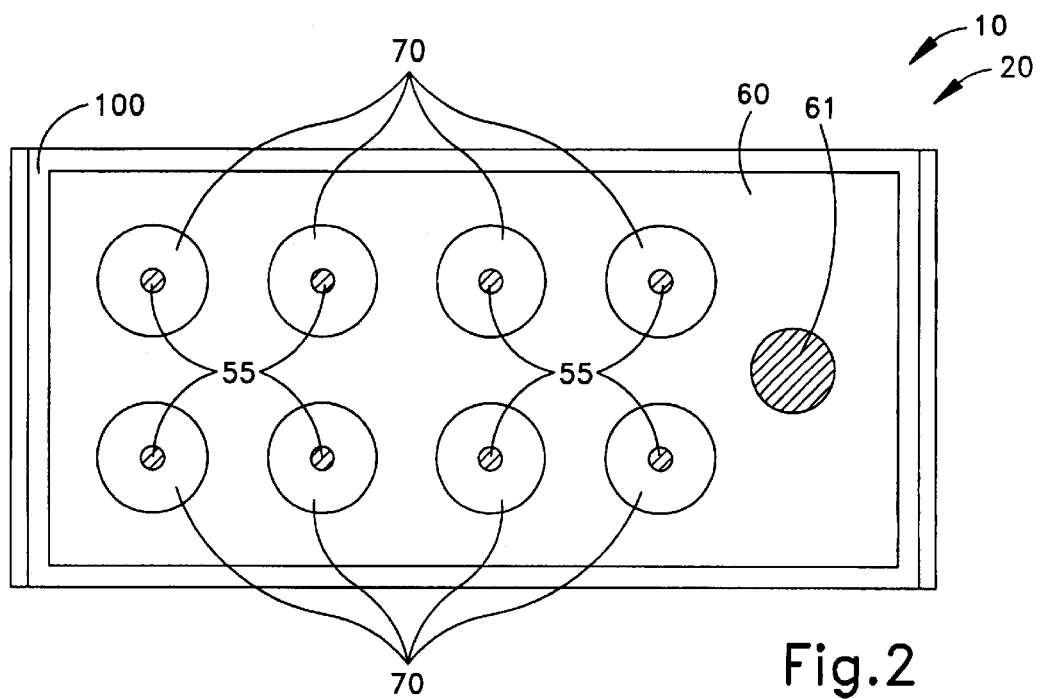
FIG. 2 is a schematic section view taken along line 2—2 in FIG. 1.

In accordance with one embodiment of the present invention, as viewed in FIGS. 1 and 2, an anti-lock braking system 10 includes an integrated electronic assembly 20. The assembly 20 comprises a printed circuit board 30, a motor 40 for driving a pump for the anti-lock braking system 10, a hydromechanical block 50 for controlling flow of pressurized fluid provided by the pump, a lead frame 60, a plurality of solenoid coils 70, and a component 80. The component 80 may be any known electrical component for the anti-lock braking system 10.

The circuit board 30 has a planar first surface 32 and a planar second surface 34 opposite the first surface. The hydromechanical block 50 is located between the circuit board 30 on one side and the lead frame 60 and plurality of solenoid coils 70 on the other side of the hydromechanical block. The hydromechanical block 50 has a through bore 52 for providing direct access from the circuit board 30 to the lead frame 60. The lead frame 60 has a planar first surface 63 and a planar second surface 64 opposite the first surface of the lead frame.

The lead frame 60 further has a built-in, integral connector 61 extending from the lead frame through the through bore 52 to the first surface 34 of the circuit board 30. The connector 61 has a set of mechanical one-way connectors 62, such as non-soldered compliant pins, extending from a distal end of the connector of the lead frame. The set of connectors 62 engages a corresponding set of apertures, or engagement holes 36, in the first surface 32 of the circuit board 30. The engagement holes 36 are located adjacent an edge 37 of the first surface 32 of the circuit board 30. The built-in connector 61 may be rigid and constructed as a single piece with the lead frame 60. The connector 61 may be cylindrical (FIGS. 1 and 2) or any other suitable shape.

As viewed in FIG. 1, the use of non-soldered connectors allows the lead frame 60 to be easily mounted on the circuit board 30 subsequent to the mounting of the plurality of solenoid coils 70 to the lead frame while also conserving space on the first surface 32 of the circuit board. Alternatively, the connectors 62 may be solderable pins, as is known in the art.

Each of the plurality of solenoid coils 70 typically has two solenoid connectors, such as solderable connectors (not shown). The solderable solenoid connectors are typically inserted completely through corresponding holes in the first surface 63 of the lead frame 60 and secured to the lead frame by solder on the second surface 64 of the lead frame, as is known in the art. The solenoid connectors may correspond to the connectors 62 of the lead frame 60 in a one-to-one or other suitable relationship for transferring control information between the plurality of solenoid coils and the circuit board.

The circuit board 30 thereby provides means for electrical control and mechanical support to the lead frame 60 and the plurality of solenoid coils 70. Since the mechanical one-way connectors 62 of the built-in connector 61 plastically deform when inserted into the engagement holes 36 of the circuit board 30, no access to the second surface 34 of the circuit board is necessary for mounting the lead frame to the circuit board. This arrangement may allow the circuit board 30 to be up to half the size of a circuit board utilizing the conventional arrangement (i.e., the solenoid coils or a lead frame mounted directly adjacent and opposite the circuit board).

The plurality of solenoid coils 70 are mechanically secured to valves 55 on the hydromechanical block 50, as is known in the art. The plurality of solenoid coils 70 controls actuation and operation of the valves 55 of the hydromechanical block 50. The valves 55 control flow of the pressurized fluid provided by the motor 40 and the pump. A cover, or lid 100, may be provided for the assembly 20 in order to protect the elements of the assembly from environmental conditions.

As viewed in FIGS. 1 and 2, the connection of the connector 61 of lead frame 60 adjacent an edge 37 of the first surface 32 of the circuit board 30 allows greater access to the other components than the conventional arrangement. The component 80 typically has a set of connectors, such as solderable connectors or non-soldered compliant pins (not shown). Other components (not shown) of the anti-lock braking system 10 may be mounted to the second surface 34 of the circuit board 30 in order to further conserve space and reduce the overall size of the circuit board and the entire anti-lock braking system.

In accordance with another feature of the present invention, the assembly 20 includes circuit board means, motor means, hydromechanical means, lead frame means, and a plurality of coil means. The circuit board means may be the circuit board 30 described above, a wiring harness, or other type of electrical routing arrangement. The motor means may be the motor 40 described above, or other type of device for driving the pump for providing pressurized hydraulic fluid for the anti-lock braking system 10. The hydromechanical means may be the hydromechanical block 50 described above, or other device for providing a hydraulic control circuit to the anti-lock braking system 10. The lead frame means may be the lead frame 60 described above, a wiring harness, or other type of electrical routing arrangement. The coil means may be the solenoid coil(s) 70 described above or other electrical actuating device(s) for operating the hydraulic valves 55 of the anti-lock braking system 10.

The motor means drives the pump or other means for providing pressurized fluid to the anti-lock braking system 10. The motor means is connected to the circuit board 30. The hydromechanical means has a through bore 52. The lead frame means has a built-in connector means extending through the through bore 52 to the circuit board means. The plurality of coil means controls flow through the hydromechanical means. Each of the plurality of coil means is connected to the lead frame means such that the plurality of coil means is electrically connected to the circuit board means by the built-in connector means. The built-in connector means may be the connector 61 described above, or other type of electrical connection device that may be constructed integral to the lead frame means.

In accordance with still another feature of the present invention, a method is used to assemble the anti-lock braking system 10. The method includes the following steps: securing the plurality of solenoid coils 70 to the lead frame 60 such that the plurality of solenoid coils is electrically connected to the lead frame; mechanically securing the plurality of solenoid coils to the corresponding plurality of valves 55 in the hydromechanical block 50; inserting a connector 61 built-in to the lead frame through the through bore 52 in the hydromechanical block such that the plurality of solenoid coils is electrically connected to the circuit board 30; and connecting the motor 40 for the anti-lock braking system 10 to the circuit board.

The assembling method further includes the step of mechanically securing the motor 40 to the pump for providing pressurized fluid to the hydromechanical block 50. The inserting step further includes inserting a plurality of connectors 62 into the circuit board 60.

In accordance with still yet another feature of the present invention, a method is used to electrically control the anti-lock braking system 10. The method includes the following steps: utilizing the plurality of solenoid coils 70 for actuating the corresponding plurality of hydraulic valves 55 located in the hydromechanical block 50; transferring control information from the circuit board 30 through the through bore 52 in the hydromechanical block 50 to the lead frame 60 and the plurality of solenoid coils 70; and communicating control information from the circuit board 30 to the motor 40 for driving the pump 90 such that pressurized hydraulic fluid is provided to the hydromechanical block 50. The transferring step includes a step of transferring control information between the circuit board 30 and the lead frame 60 through the connector 61 built-in to the lead frame.

From the above description of the invention, those skilled in the art will perceive improvements, changes and modifications. Such improvements, changes and modifications within the skill of the art are intended to be covered by the appended claims.

Having described the invention, the following is claimed:

1. An assembly for an anti-lock braking system, said assembly comprising:

a circuit board for integrating the electronics of the anti-lock braking system, said circuit board having a first side and a second side opposite said first side;

a motor for providing pressurized fluid to the anti-lock braking system, said motor being connected to said first side of said circuit board;

an electronic component connected to said first side of said circuit board;

a hydromechanical block for the anti-lock braking system, said hydromechanical block having a through bore;

a lead frame having a built-in connector extending through said through bore to said second side of said circuit board, said built-in connector being constructed as a single piece with said lead frame, said hydromechanical block being located between said lead frame and said circuit board, said circuit board being located between said motor and said hydromechanical block;

a plurality of connector pins extending from said built-in connector of said lead frame to said circuit board, each of said connector pins being plastically deformable, one- way connectors;

a cover for protecting said assembly from environmental conditions; and a plurality of solenoid coils for controlling operation of a corresponding plurality of valves in said hydromechanical block and thereby controlling flow of the pressurized fluid through said hydromechanical block, each of said plurality of solenoid coils being connected to said lead frame such that said plurality of solenoid coils is electrically connected to said circuit board by said built-in connector of said lead frame, each of said plurality of solenoid coils being mechanically connected to a corresponding valve in said hydromechanical block.

* * * * *